(12) United States Patent
Chen et al.

(10) Patent No.: US 10,540,314 B2
(45) Date of Patent: *Jan. 21, 2020

(54) SYSTEM TRANSPARENT RETIMER

(71) Applicant: PARADE TECHNOLOGIES, LTD., Santa Clara, CA (US)

(72) Inventors: Jian Chen, Santa Clara, CA (US); Ming Qu, San Jose, CA (US); KC Lee, Santa Clara, CA (US); Zhengyu Yuan, Santa Clara, CA (US); Qing Ouyang, Santa Clara, CA (US)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,845

(22) Filed: Feb. 1, 2019

(65) Prior Publication Data
US 2019/0171607 A1      Jun. 6, 2019

Related U.S. Application Data

(60) Continuation of application No. 15/686,116, filed on Aug. 24, 2017, now Pat. No. 10,198,393, which is a
(Continued)

(51) Int. Cl.
*G06F 13/00* (2006.01)
*G06F 13/12* (2006.01)
(Continued)

(52) U.S. Cl.
CPC ...... *G06F 13/4221* (2013.01); *G06F 11/3027* (2013.01); *G06F 11/3051* (2013.01); *Y02D 10/14* (2018.01); *Y02D 10/151* (2018.01)

(58) Field of Classification Search
CPC ........... G06F 13/00; G06F 13/12; G06F 13/14
See application file for complete search history.

(56) References Cited

U.S. PATENT DOCUMENTS

2012/0191997 A1*  7/2012  Miller ..................... G06F 1/32
                                                              713/323
2012/0317446 A1* 12/2012  Jaramillo ............. G06F 11/221
                                                               714/43
(Continued)

OTHER PUBLICATIONS

Chen, Notice of Allowance, U.S. Appl. No. 14/802,957, filed Sep. 1, 2017, 12 pgs.

(Continued)

*Primary Examiner* — David E Martinez
(74) *Attorney, Agent, or Firm* — Morgan, Lewis & Bockius LLP

(57) ABSTRACT

A protocol transparent retimer circuit monitors certain link layer control signals, detects far-end receiver parameters of the link partners, and detects attributes of the data signal on the link to determine the link status and operate the retimer in accordance with the determined link status. By combining and reducing host and device system states into a few retimer states, the retimer circuit is largely simplified and yet still serves its purpose. The retimer includes a controller that employs a state machine to interpret the monitored and detected signals to determine the link state and operate the retimer in an operational state corresponding to the determined link state. The approach enables the retimer to restore signal integrity and forward data it receives in both downstream and upstream directions of the link without frequency alteration.

20 Claims, 5 Drawing Sheets

Related U.S. Application Data division of application No. 14/802,957, filed on Jul. 17, 2015, now Pat. No. 9,858,234.

(51) Int. Cl.
*G06F 13/14* (2006.01)
*G06F 13/42* (2006.01)
*G06F 11/30* (2006.01)

(56) References Cited

U.S. PATENT DOCUMENTS

| | | | |
|---|---|---|---|
| 2015/0363350 A1* | 12/2015 | Yeung | G06F 13/4221 710/106 |
| 2015/0378952 A1* | 12/2015 | Chen | G06F 13/423 710/105 |
| 2016/0191313 A1* | 6/2016 | Chen | H04L 41/0816 370/315 |

OTHER PUBLICATIONS

Chen, Notice of Allowance, U.S. Appl. No. 15/686,116, filed Sep. 25, 2018, 12 pgs.

* cited by examiner

SYSTEM TRANSPARENT RETIMER

RELATED APPLICATIONS

This application is a continuation of and claims priority to U.S. patent application Ser. No. 15/686,116, filed Aug. 24, 2017, entitled "System Transparent Retimer," which is a divisional application of U.S. patent application Ser. No. 14/802,957, filed on Jul. 17, 2015, entitled "System Transparent Retimer," now U.S. Pat. No. 9,858,234, issued on Jan. 2, 2018, each of which is incorporated by reference herein in its entirety.

TECHNICAL FIELD

The disclosure generally relates to loss compensation circuits for a communication interconnect, and in particular to improved operational state switching schemes for a retimer circuit.

BACKGROUND

Interconnections for electronic systems continue to provide increased bandwidth and improved functionality to serve the computing demands of highly integrated computing devices. Many of these interconnect technologies support multiple legacy data rates along with high speed modes operating at data rates of 10 Gbps and higher. The quality of data transmission at these rates often degrades due to transmission channel loss caused by the material and geometry of the transmission line.

To compensate for signal degradation due to channel loss, many interconnect technologies employ loss compensation devices along the transmission channel. Loss compensation devices operate at the physical layer to improve data transfer rate by modifying certain aspects of the physical layer signal or regenerating the physical layer signal to improve signal quality. For interconnect technologies that employ both physical layer and link layer functionality, many loss compensation devices also include functionality to handle data path management, power state management, and other link layer functionality. The processing of link layer signals adds additional complexity and increases power consumption for loss compensation architectures that employ such features. Loss compensation techniques employing less complexity, however, lack the ability to determine system status. Unaware of the system status, these simpler interconnect systems may limit the ability of the interconnect system to transition to and from different operating states.

SUMMARY

In accordance with some embodiments, a method transfers data between interconnected devices. The method is performed at a retimer circuit configured to couple a host and a device electrically. The method monitors first data (received from the host) and second data (received from the device). The host and the device are electrically coupled to each other via an interconnect. The method obtains a host side band detection signal indicating a first data speed of the first data and obtains a device side band detection signal indicating a second data speed of the second data. The method determines the operational state of the retimer based on: (i) at least one of the monitored first data and the monitored second data; and (ii) at least one of the host side band detection signal and the device side band detection signal.

In some embodiments, the method obtains a host side receiver status signal indicating at least a far-end impedance of a receiver in the host and obtains a device side receiver status signal indicating at least a far-end impedance of a receiver in the device. The operational state of the retimer is determined based on at least one of the host side receiver status and the device side receiver status.

In accordance with some embodiments, a retimer circuit transfers data between interconnected devices. The retimer circuit includes a host receiver circuit configured to receive first data from a host and transmit the first data to a device via a device transmitter circuit. The host and the device are electrically coupled to each other via an interconnect. The retimer circuit also includes a host transmitter circuit configured to receive second data from the device via a device receiver circuit and transmit the second data to the host. In addition, the retimer circuit includes a controller coupled to the host receiver circuit, the device transmitter circuit, the device receiver circuit, and the host transmitter circuit. The controller is configured to: (i) obtain a host side band detection signal indicating a first data speed of the first data; and (ii) obtain a device side band detection signal indicating a second data speed of the second data; and (iii) determine the operational state of the retimer based on (1) at least one of the monitored first data and the monitored second data and (2) at least one of the host side band detection signal and the device side band detection signal.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
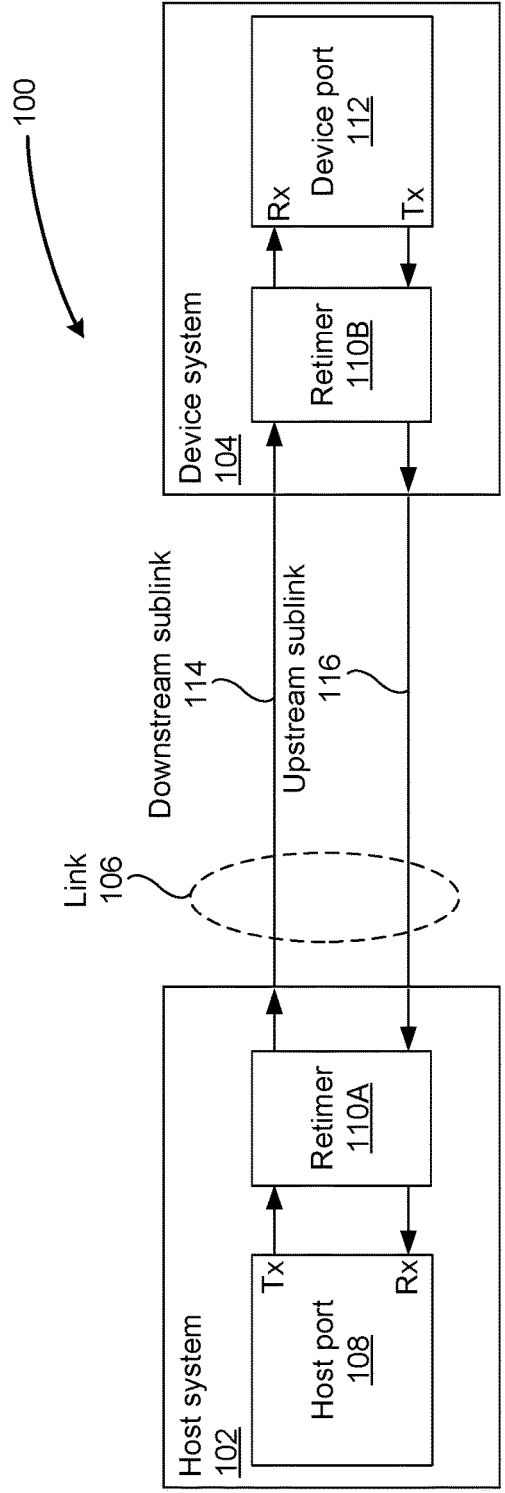
FIG. 1A is block diagram illustrating an interconnect system including a retimer, in accordance with some embodiments.

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview—Protocol Transparent Retimer

Various embodiments provide systems and methods for using a retimer circuit to compensate for data transmission channel loss for interconnection systems, such as a host and a device connected by a Universal Serial Bus (USB). Many interconnect systems, such as USB 3.1, use multiple types of handshake signaling between devices depending on the operating mode of the interconnect system. For example, USB 3.1 conducts handshaking at a first rate during 5 Gbps or 10 Gbps operation, and conducts handshaking at a second rate when operating at less than 5 Gbps operation, referred to as low frequency periodic signaling (LFPS) operation. Retimer architectures for USB 3.1 interconnects also support multiple types of handshake signaling to support different operating modes of USB 3.1.

The disclosed retimer architecture decodes specified handshake messages during LFPS operation, while monitoring the interconnect for the presence of 5 Gbps or 10 Gbps handshake messages, corresponding to SuperSpeed signaling and SuperSpeed Plus signaling, respectively. In particular, the disclosed retimer architecture includes a controller that decodes LFPS messages, detects far-end receiver parameters of the host system and device system coupled to the link, and detects attributes of the data signal on the link to determine the link status. For example, the disclosed retimer is configured to monitor and decode LFPS messages, detect far-end receiver termination of link partners, and detect high speed handshake messages indicating loss of signaling at 5 Gbps and 10 Gbps. By detecting high speed handshake messages indicating of loss of signaling at 5 Gbps and 10 Gbps, the controller may detect a high speed data operating mode without decoding high speed data handshake messages. High speed data (e.g., 5 Gbps and 10 Gbps data) passes through the retimer substantially unmodified, in that the retimer outputs the high speed data at the same or substantially the same frequency as the high speed data received by the retimer. Such a feature is enabled by the retimer because the retimer does not use a local oscillator, crystal, or other type of clock having a different time domain to retime the received signal. Accordingly, the disclosed retimer architecture eliminates circuitry typically used in USB 3.1 retimers for decoding and processing 5 Gbps and 10 Gbps data.

The disclosed retimer includes a controller circuit that employs a retimer training and status state machine (RTSSM) that interprets the monitored and detected signals to determine the link state and operate the retimer in a retimer operating state corresponding to the determined link state. By monitoring the control signal and associated control signal messages, the retimer circuit may determine the link state associated with host and device systems coupled to communication across the link. Based on the determined link state, the retimer may transition to or maintain a retimer operating state corresponding to the determined system state. Because the RTSSM uses a subset of the available control signals and detected information to determine the link state, the disclosed RTSSM uses fewer states to determine the link status. In contrast, conventional USB retimer state machines that support SuperSpeed signaling use a much more complex state machine that relies on intercepting and regenerating significantly more control signals and other information to determine the link state. By using a targeted monitoring and detection scheme instead of a broad intercepting and regenerating scheme, the disclosed retimer also provides the additional benefit of eliminating circuitry including encoders, decoders, scramblers, descramblers, serializers, deserializers, and local reference clocks used in convention USB retimers that support SuperSpeed data links.

Interconnect System

FIG. 1A illustrates an interconnect system including a host system 102 and device system 104 coupled for communicating by a link 106, in accordance with some embodiments. The host system 102 may be a computing system or computing device that initiates communication across the link 106. Example host systems 102 include a smart phone, tablet computer, laptop, server or other device equipped with a processor and interface circuitry configured to initiate communication with another computing device. In some embodiments, the host system 102 includes a host port 108 coupled to a retimer circuit 110A. The host port 108 interfaces between the host system 102 and the link 106 or the host system 102 and a retimer circuit 110A. The device system 104 may be a peripheral device, such as storage device, imaging device, pointing device, printer, or a computing system or computing device that responds to communications initiated by the host system 102. A device system 104 may also include a hub that expands a single interface port into multiple interface ports that may be coupled to the host system 102. The device system 104 includes a device port 112 that interfaces between the device system 104 and the link 106 or between the device system 104 and a retimer 110B.

The retimer circuit 110 relays communication between the host system 102 and the device system 104 to compensate for signal losses along the transmission data path between the host system 102 and the device system 104. Communication between the host system 102 and the device system 104 includes both physical layer and link layer information. The retimer circuit 110 monitors a specified portion of the link layer information to initialize the link, perform link training, monitor the status of the host system 102 and the device system 104, and relay communication between the host system 102 and the device system 104 as further discussed with reference to FIGS. 2, 3A, 3B, and 3C. In some embodiments, the retimer 110 receives functional data and control data from a transmitting port of a host system 102 or a transmitting port of a device system 104, processes the received data to determine the operating state of the host system 102 and the device system 104, employs a retimer operating state to correspond to the determined operating state, and transmits operational data and control data received from the link 106 to a host port 108 or a device port 112 in accordance with the determined operating state. One or more retimers 110 may be employed on one or more components of the interconnect system (e.g., within the host system 102, link 106, or device system 104) depending on the particular signaling environment.

The link 106 is a physical communication path between a host system 102 and a device system 104. The link 106 is comprised is comprised of a downstream sublink 114 and an upstream sublink 116. Downstream refers to the direction of data flow towards the device system 104. Upstream refers to the direction of data flow towards the host system 102. Each sublink may comprise a group of receiver or transmitter lanes between a downstream facing port (i.e., downstream port) and an upstream facing port (i.e., upstream port). A lane refers to a connection between a transmitter of one port to the receiver in another port. The downstream sublink 114 includes a group of lanes between a downstream transmitter included in the host port 108 and an upstream receiver included in the device port 112. The upstream sublink 116 includes a group of lanes between a downstream receiver included in the host port 108 and an upstream transmitter included in the device port 112. Although FIG. 1A shows a single lane included in each of the downstream sublink 114 and the upstream sublink 116, each sublink may include multiple lanes.

Figure 1B:
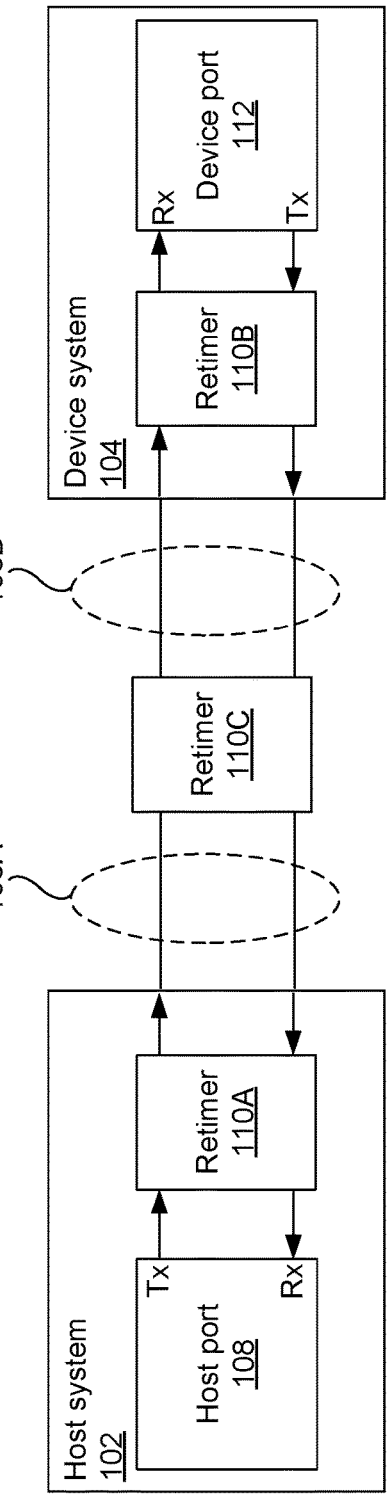
FIG. 1B is another block diagram illustrating an interconnect system including a retimer, in accordance with some embodiments.

The link 106 may represent a physical cable comprised of one or more dedicated pairs of differential signaling conductors for transmission and reception, and a connector on each end of the link 106 that provides a physical electrical connection between the link 106 and the host system 102 and the device system 104. For example, the link 106 may be a cable that supports USB 3.1 signaling rates. In some embodiments, a link 106 may be divided into segments when an intervening component(s) is placed in the data path between the host system 102 and the device system 104. Example intervening components include a hub or a retimer circuit. For example, as shown in FIG. 1B, a retimer circuit 110C located in the data path between the host system 102 and the device system 104 and external to both systems, forming two link segments. A first link segment 106A is connected between a host system 102 and a retimer circuit 110C, while a second link segment 106B is coupled between the retimer circuit 110C and the device system 104. Additional embodiments may include more than two link segments depending on the number of retimers circuit I IO placed in the data path between the host system 102 and the device system 104.

Figure 2:
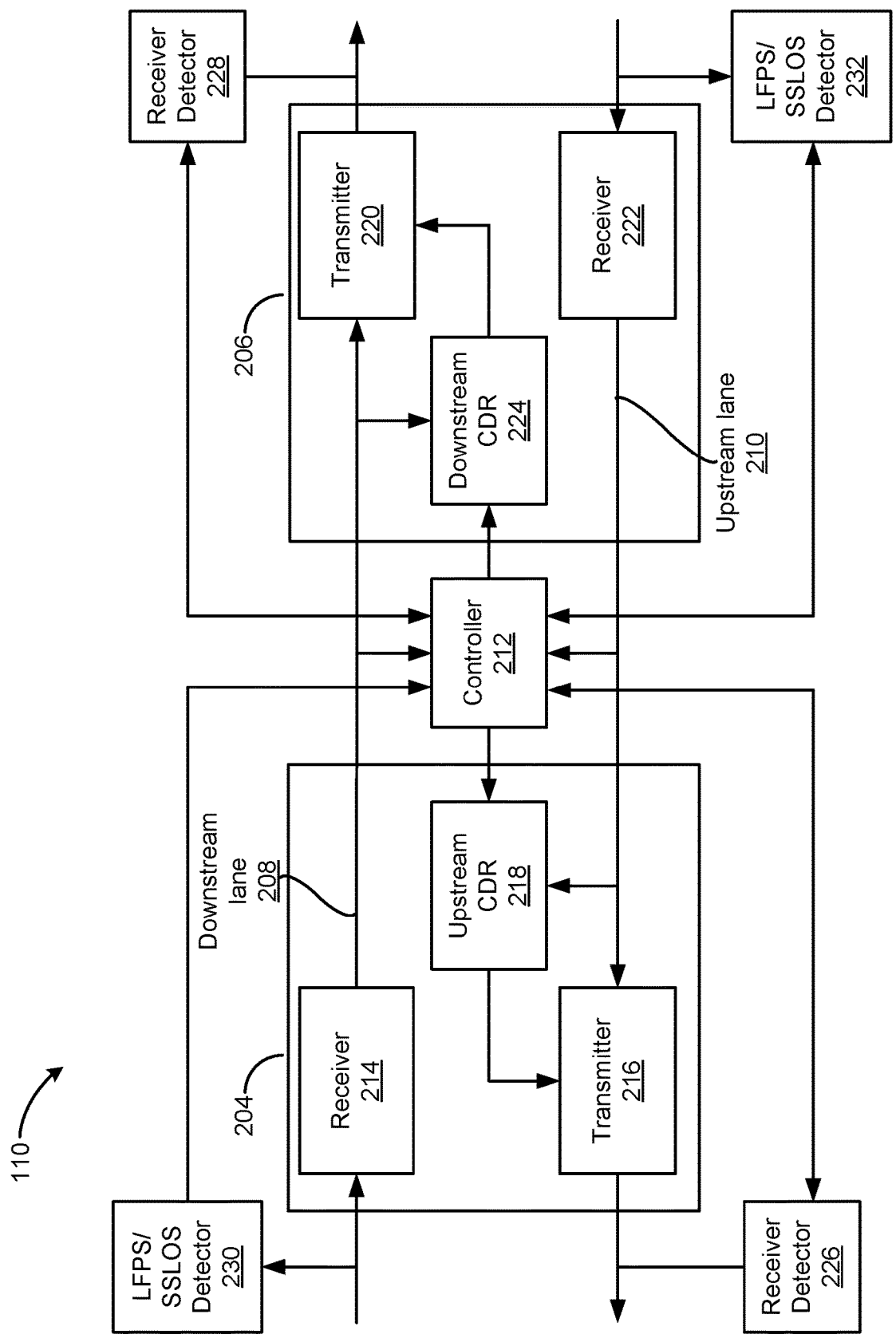
FIG. 2 is a block diagram illustrating a detailed view of a retimer architecture, in accordance with some embodiments.

FIG. 2 is a block diagram illustrating a detailed view of a retimer circuit 110 in accordance with some embodiments. The retimer circuit 110 includes a pair of ports 204 and 206 connected by a pair of lanes 208 and 210, and a controller 212 coupled to receive information from each lane and provide control information to each port. The port 204 is a downstream port, which is the port electrically closest to the host system 102. The downstream port 204 includes a receiver circuit 214 that has an input coupled to receive functional data and control signals from the host system 102 and an output coupled send information onto the downstream lane 208. In some embodiments, the receiver circuit 214 may also include or be coupled to an equalizer circuit or other signal conditioning components to improve the electrical sensitivity of the receiver circuit 214.

The input of the receiver circuit 214 is coupled to a detector 230 configured to detect LFPS messages and detect messages high speed signaling handshake messages, such as SuperSpeed loss of signal (SSLOS). In one implementation, the LFPS/SSLOS detector 230 includes an LFPS detector circuit that detects the length of the pulse train and the relative length of the pulse train compared to the duration of electrical idle between pulse trains to extract the carried LFPS messages. LFPS is a side-band of communication transmitted on the SuperSpeed data lines at frequency range from 20 MHz to 50 MHz, compared to the 5 Gbps data rate for SuperSpeed signaling. In operation, the LFPS signal helps to manage signal initiation and low power management on the link between two ports. The LFPS signal comprises of pulse trains separated by an electrical idle period as previously described. The LFPS signal may be generated by an LFPS driver circuit located within a transmitter circuit, such as transmitter circuit 216 and 220. In one implementation, the LFPS driver circuit shares a portion of the circuitry located in the transmitter circuit used to drive SuperSpeed data. In another implementation, the LFPS driver circuit is a separate driver from the SuperSpeed data driver circuit. The LFPS/SSLOS detector circuit 230 determines the time duration of the pulse train and the duration of the electrical idle period between pulse trains. In some embodiments, the controller 212 receives the determined time durations and compares the duration of pulse train to the duration of the electrical idle to extract the LFPS messages. Alternatively, the LFPS/SSLOS detector circuit 230 compares the duration of the pulse train to the duration of the electrical idle period and sends an indication of the comparison to the controller 212 for processing.

The LFPS/SSLOS detector circuit 230 also includes a circuit for detecting certain high speed handshake signals. In one implementation, the LFPS/SSLOS detector circuit 230 is configured to detect SuperSpeed loss of signal by detecting the amplitude of the SuperSpeed signal and comparing the detected amplitude to a specified threshold voltage level. In one implementation, if the detected signal satisfies the voltage threshold, the LFPS/SSLOS detector circuit 230 generates a signal indicating the presence of SuperSpeed data; otherwise the LFPS/SSLOS detector circuit 230 generates a signal indicating loss of SuperSpeed data. The generated indicator may be a multi-voltage level signal, where a first voltage level indicates a first state (e.g., presence of SuperSpeed data) and a second voltage level indicates a second state (e.g., absence of SuperSpeed data).

The downstream port 204 also includes a transmitter circuit 216 that has a first input coupled to receive functional data and control signals from upstream lane 210, a second input coupled to receive a clock signal from upstream clock data recovery (CDR) circuit 218, and an output coupled to send data received from the upstream lane 210 to the host system 102. The transmitter circuit 216 may also include a third input coupled to receive a control signal from the controller 212 to change the operating state of the transmitter circuit 216. Example transmitter operating states include disabled, enabled, and reduced power consumption state. The transmitter circuit 216 may include circuitry coupled to the third input and configured to interpret the control signal from the controller 212 to set the operating state of the transmitter circuit 216 based on the control signal. When the transmitter circuit 216 is in an enabled state, the transmitter circuit 216 generates output information at a rate that corresponds to rate of the clock signal generated by the upstream CDR circuit 218. In some embodiments, the transmitter circuit 216 may include or be coupled to signal conditioning circuitry such as pre-emphasis circuitry, amplifiers, or filters.

The upstream CDR circuit 218 has a first input that receives functional data from the upstream lane 210. The upstream CDR circuit 218 recovers a clock signal embedded in the received functional data and generates an output clock having a clock rate matched to the rate of the clock signal embedded in the received functional data. In some embodiments, the upstream CDR circuit 218 may include an amplifier, filter, equalizer, and phase lock loop that operate in conjunction to extract a clock signal embedded in the functional data received from the upstream port 206 and to generate a recovered clock. In contrast to conventional retimers for use in interconnect systems that support USB, the upstream CDR circuit 218 does not use local crystal oscillator or other type of reference clock. Instead, the upstream CDR circuit 218 uses an inductor-capacitor (LC) network configured to operate as a tunable LC oscillator to generate a reference clock. The tunable LC oscillator is automatically tuned to the frequency of the clock embedded within the data received by the receiver circuit 214. The upstream CDR circuit 218 may include a second input for receiving one or more control signals from the controller 212 to enable or disable the upstream CDR circuit 218. For example, the controller 212 may generate an enable signal to enable the upstream CDR circuit 218, responsive to determining the presence of SuperSpeed data on the link. Otherwise, the controller 212 generates a signal to disable the upstream CDR circuit 218 or place the upstream CDR circuit 218 in a low power state relative to the power consumed during normal operation of the upstream CDR circuit 218. Additionally, the downstream port 204 is coupled to a receiver detector 226 to detect the status of the receiver in the host port 108 of the host system 102. The receiver detector 226 includes a detector circuit coupled to the output of the transmitter circuit 216 that detects the far-end impedance of a receiver included in the host port 108. In one implementation, the receiver detector circuit 226 is a common mode voltage detection circuit based on the difference of time constant between far end high impedance termination and low impedance termination. The receiver detector circuit 226 initiates detection of the far end termination responsive to receiving an enable signal from the controller 212. Information representing the value of the detected impedance is output by the receiver detector 226 to the controller 212 where it is further processed to determine the operating state of the host system 102.

The upstream port 206 includes components similar to those included in the downstream port 204, including a transmitter circuit 220, a receiver circuit 222, and a downstream CDR circuit 224. For example, the transmitter circuit 220 has a first input coupled to receive functional data and control signals from downstream lane 208, a second input coupled to receive a clock signal from the downstream CDR circuit 224, and an output coupled to send data received from the downstream lane 208 to the device system 104. The transmitter circuit 220 may also include a third input coupled to receive a control signal from the controller 212 to change the operating state of the transmitter circuit 220 in a manner similar to the transmitter circuit 216 included in the downstream port 204. When the transmitter circuit 220 is in an enabled state, the transmitter circuit 220 generates output information at a rate that corresponds to the rate of the clock signal generated by the downstream CDR circuit 224.

The upstream port 206 also includes a receiver circuit 222 that has an input coupled to receive functional data and control signals from the device system 104 and an output coupled to send information onto the upstream lane 210, and may otherwise be configured similar to the receiver circuit 214 included in the downstream port 204. The input of the receiver circuit 222 is coupled to an LFPS/SSLOS detector 232, which operates in a manner similar to the LFPS/SSLOS detector 230. Additionally, the upstream port 206 is coupled to a receiver detector 228 to detect the status of the receiver in the device port 112 of the device system 104. The receiver detector 228 operates in a manner similar to the receiver detector 226. Information representing the value of the detected impedance is output by the receiver detector 228 to the controller 212 where it is further processed to determine the operating state of the device system 104.

The controller 212 controls the operating state of the retimer circuit 110 based on the determined operating states of the host system 102 and the device system 104. The controller 212 determines the operating state of the host system 102 and the device system 104 by monitoring and/or detecting the presence of specified control signals and by detecting physical parameters of the downstream receiver port 214 and the upstream receiver port 222 as previously described. The controller 212 monitors the detected LFPS messages received from the LFPS/SSLOS detectors 230 and 232. Example, LFPS messages include Polling.LFPS and Ping.LFPS. Polling.LFPS is a substate designed to synchronize the operations between a host system 102 and a device system 104 coupled to a link 106 after exiting from a receiver detection state as further described with reference to FIGS. 3A, 3B, and 3C. Polling.LFPS is also a substate for a port to identify its capabilities based on various Polling.LFPS signatures. A Ping.LFPS message is a signal sent through an upstream lane by a device to identify its presence during a low power state U3, as further described.

The controller 212 may infer the link state of the host system 102 and/or the device system 104 based on one or a combination of the LFPS signal and LFPS messages generated by the host system 102 or the device system 104. For example, the controller 212 may determine that the host system 102 or device system 104 are in an electrical idle state if no LFPS signal is detected by the retimer 110 within a specified threshold interval. The controller 212 may also send control signals to the receiver detector 226 and the receiver detector 228 to determine the detection status of the corresponding receiver ports for the host system 102 and the device system 104. Using the detected LFPS signal, LFPS messages, and the receiver detection status for each port, the controller 212 may determine the host/device system operating state.

In some embodiments, the controller 212 is a processing device such as a micro controller including memory and a processing core that executes instructions that control the operating state of the retimer circuit 110. In some embodiments, the controller 212 is configured to operate as retimer training and status state machine (RTSSM) that controls the operation between the downstream port 204 and the upstream port 206 and performs interconnect system management functions, including link state detection, retimer power management, and data path management. The RTSSM maps multiple host and device system states specified in the USB 3.1 specification into a single retimer state referred to as a SNOOP state. During the SNOOP state, the RTSSM uses information about LFPS signal detection and SSLOS detection to track and classify host and device system operational states and to make the retimer 110 enter the corresponding state.

Figure 3A:
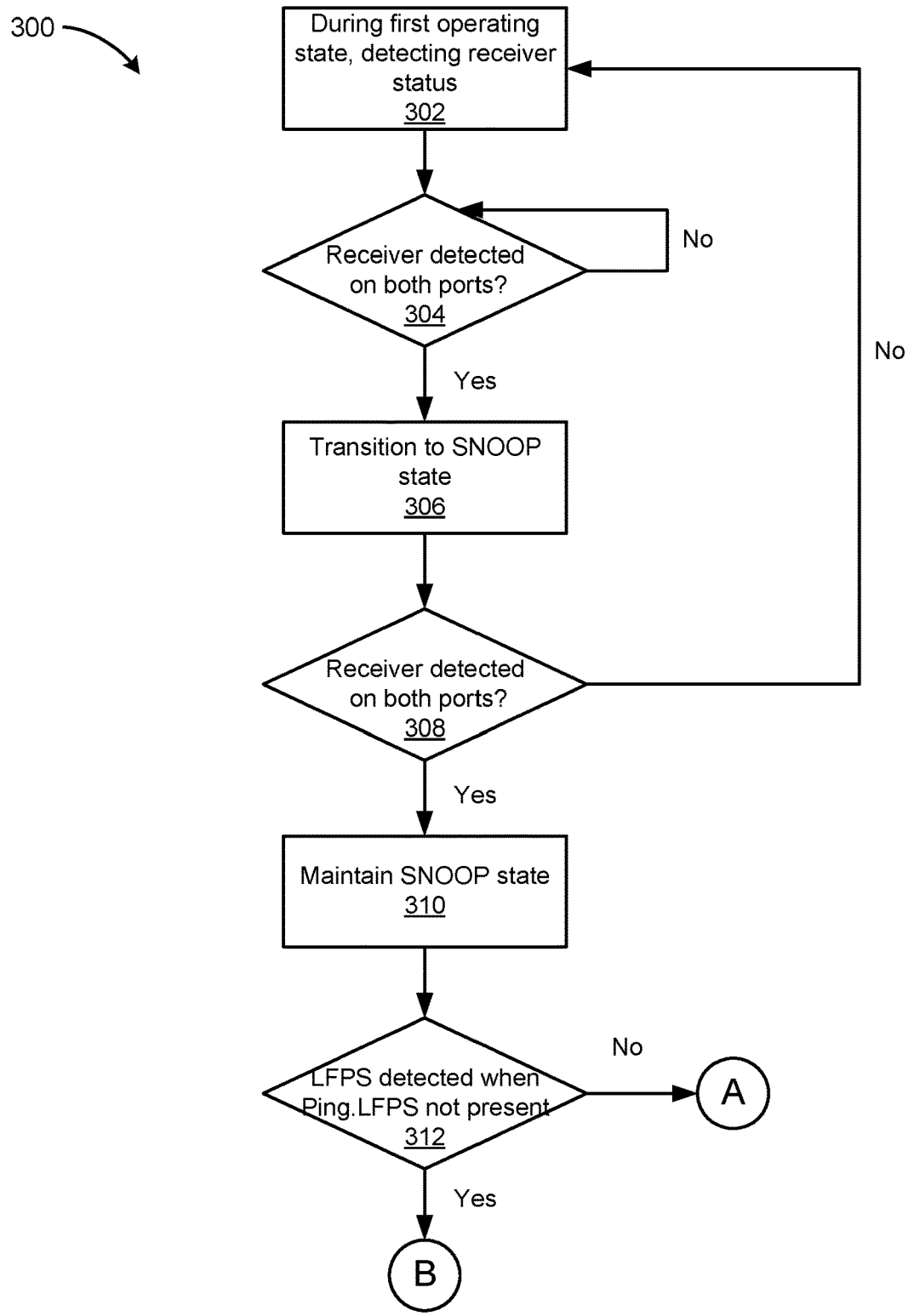
FIG. 3A illustrates a flow chart illustrating a process for switching operational states of a retimer circuit, in accordance with some embodiments.

FIG. 3A illustrates a flow chart 300 illustrating a process employed by the RTSSM for switching operational states of a retimer circuit 110, accordance with some embodiments. As previously discussed, the RTSSM maps multiple host and device system states specified in the USB 3.1 specification into a single retimer state referred to as a SNOOP state. The Link Training and Status State Machine (LTSSM) specified in the USB 3.1 specification defines twelve individual states that include four operational link states, U0, U1, U2, and U3. During the U0 an Enhanced SuperSpeed link (i.e., 10 Gbps data rate link) is enabled and packet transfers are in progress or the link is idle. The U1 state is low power link state where no packet transfer is carried out and the Enhanced SuperSpeed link connectivity can be disabled to conserve the link power. U2 is another low power link state that provides additional power saving beyond that of U1, however, with a penalty of increased exit latency. U3 is a suspend state that provides additional power saving beyond that of U2. USB 3.1 specification also specifies four link states Rx.Detect, Polling, Recovery, and Hot Reset, that are introduced for link initialization and training. Rx.Detect represents the initial power-on link state where a port is attempting to determine if its Enhanced SuperSpeed link partner is present. Upon detecting the presence of an Enhanced SuperSpeed link partner, the link training process will be started. Polling is a link state that is defined for the two link partners to have their Enhanced SuperSpeed transmitters and receivers trained, synchronized, and ready for packet transfer. Recovery is a link state defined for retraining the link when the two link partners exit from a low power link state, or when a link partner has detected that the link is not operating in UO properly and the link needs to be retrained, or when a link partner decides to change the mode of link operation. Hot Reset is a state defined to allow a downstream port to reset its upstream port. Two other link states, Loopback and Compliance Mode, are introduced for bit error test and transmitter compliance test. Two additional link states include eSS.Inactive, which is a link error state where a link is in a non-operable state and software intervention is needed and eSS.Disabled, which is a link state where Enhanced SuperSpeed connectivity is disabled and the link may operate under USB 2.0 mode. The LTSSM specified in USB 3.1 uses each of the twelve operational states to determine the host/device system state and place the retimer in an operation mode corresponding to the determined mode.

The RTSSM in the disclosed retimer, in contrast, maps a specified group of host and device system states specified in USB 3.1 into a single state. In some embodiments, the RTSSM maps the system state Polling.LFPS, power saving states (U1, U2, and U3), including all of their substates into a single state referred to as the SNOOP state. By mapping multiple states into a single SNOOP state, the disclosed retimer circuit 110 reduces the circuit complexity and utilizes less power and circuit area compared to the retimer circuit architecture specified by the USB 3.1 standard. The RTSSM begins operation in the Rx.Detect state. At power-on of the host system 102 and the device system 104, the controller 212 enters a power on state call Rx.Detect. The purpose of Rx.Detect is to detect the impedance of far-end receiver termination to ground. In the Rx.Detect state the retimer 110 performs 302 at a specified interval receiver detection on both the downstream receiver included in the host port 108 and the upstream receiver included in the device port 112. In some embodiments, the specified interval includes a range of 1 ms to 20 ms. For example, in one implementation the specified interval is 12 ms. The controller 212 determines 304 whether the receiver is detected on both ports within the specified interval. If the downstream receiver included in the host port 208 and the upstream receiver included in the device port 112 is detected within the specified interval, the retimer 110 will transition 306 to the SNOOP state. Otherwise the retimer 110 will remain in the Rx.Detect state.

The SNOOP state combines system state Polling.LFPS, power saving states (U1, U2, and U3), including all of their substates. Upon entering the SNOOP state, the retimer circuit 110A operates in a power saving mode by disabling both downstream CDR 224 and upstream CDR 218. If the retimer circuit 110A detects that the link has been in LFPS idle for more than 300 ms after entering the SNOOP state, the retimer circuit 110A enters a deeper power saving mode by disabling all the circuits in the retimer circuit 110A except the LFPS detectors 230 and 232, and receiver detectors 226 and 228. In the SNOOP state the controller 212 determines 308 at a specified interval, whether the receivers included both the host port 208 and the device port 112 can be detected. In some embodiments, the specified interval includes a range of 1 ms to 100 ms. For example, in one implementation the specified interval is 50 ms. If either the downstream receivers in both the host port 108 and the device port are detected within the specified interval, the retimer circuit 110 will remain 310 in the SNOOP state. Otherwise the retimer circuit 110 will return to the Rx.Detect state. On the other hand, if the controller 212 detects the LFPS signal during the specified interval, the receiver detection is aborted until the LFPS signal is no longer detected.

Figure 3B:
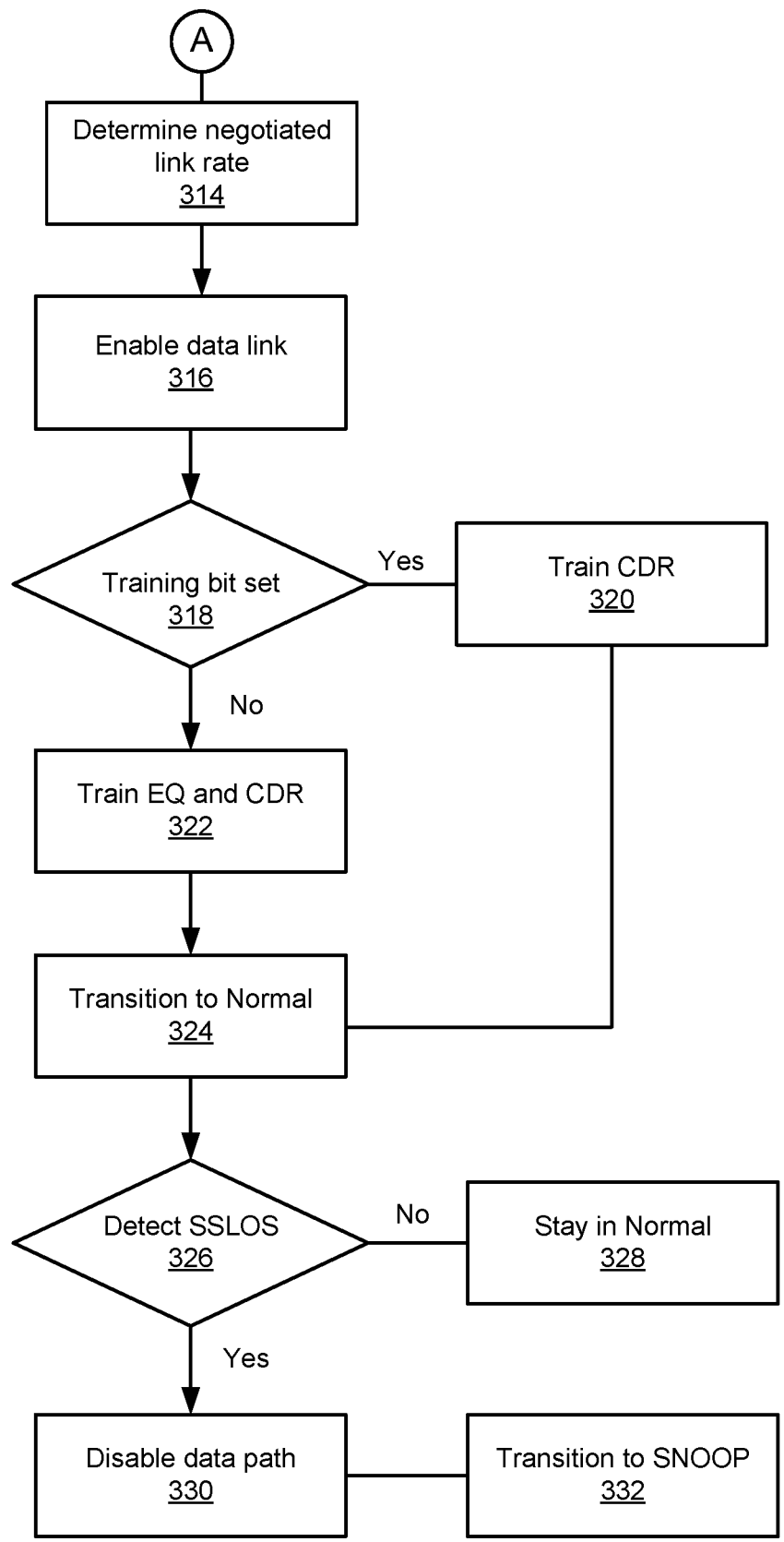
FIG. 3B illustrates a flow chart illustrating a further process for switching operational states of a retimer circuit, in accordance with some embodiments.

During the SNOOP state, if the controller 212 detects 312 LFPS in the absence of the Polling.LFPS signal, the retimer 110 decodes the Polling.LFPS signals to determine 314 the negotiated link speed for communicating data between the host system 102 and the device system 104, as shown in FIG. 3B. In some embodiments, the link speeds may be 5 Gbps or 10 Gbps depending highest data rate supported by the host system 102 or the device system 104. For example, if the device system 104 supports a highest data rate of 5 Gbps and the host system 102 supports a highest data rate of 10 Gbps, the negotiated link rate will be 5 Gbps. In cases where no speed negotiation is detected, the retimer 110 uses the previous link speed setting as a current link rate. During the SNOOP state, the retimer 110 enables its LFPS driver circuit immediately after receiving any LFPS signal and forwards the received LFPS signal, if the LFPS driver has been previously disabled.

Returning to FIG. 3B, following the link speed negotiations, the controller 212 enables 316 the SuperSpeed data path, including enabling LFPS/SSLOS detector circuit 230 or 232. The SuperSpeed data path refers to a high speed signal path supported by the USB 3.x protocol. The SuperSpeed data path support data rates of 5 Gbps and 10 Gbps. The controller 212 then proceeds with training the data path. During the SNOOP state, the controller 212 checks 318 whether the training bit is set to determine the extent of training to be performed on the retimer circuit 110. In some embodiments, the example training includes equalization (EQ) training and CDR training. If the training bit is set, the controller 212 trains 320 one or both of the CDR circuits 218 and 224. Once CDR training is complete the, retimer transitions 324 to a NORMAL state. Similar to the SNOOP state, the RTSSM maps multiple host and system operational states to another combined state referred to as the NORMAL state. The NORMAL state represents a combination of states including the system state UO, Recovery, Hot reset and Passthrough/Loopback. The Recovery link state is entered to retrain the link, or to perform Hot Reset, or to switch to Loopback mode. A Hot reset is a reset initiated by the device system 104. In the Passthrough state, the retimer circuit allows data received by a receiver circuit 214 or 222 to pass through to the receiver circuit 214 or 222 without modifying the frequency of the incoming data, as previously described. During the NORMAL state, the retimer 110 recovers the data signal, restores the signal integrity of the received data signal and forwards the received signal through the transmitter circuit to the following stage (e.g., host system 102, hub, retimer circuit 110, or device system 104).

If the training bit is not set, the controller 212 performs 322 equalization training on one or both receiver circuits included in the host port 108 and the device port 112 along with training the CDR. In some embodiments, the retimer circuit 110 uses received data to train itself and forward a recovered version of the data to train its following stage. Conventional retimers that support USB 3.x, in contrast, use locally generated training data patterns to train subsequent stages, which uses more circuitry and consumes more area and power compared to the disclosed retimer 110. When the equalization and CDR circuit training is complete, the controller 212 transitions 324 the retimer circuit 110 to the NORMAL state. During the NORMAL state, the controller 212 checks 326 for whether the SuperSpeed loss of signal detector circuit indicates loss of signal. If the detector 230 detects the SuperSpeed signal, the controller 212 maintains 328 the retimer circuit 110 in the NORMAL state. Otherwise, if the detector 230 does not detect the SuperSpeed signal within a specified detection period, the controller 212 will disable 330 the SuperSpeed data path. In some embodiments, the specified detection period is at least 1 ms. After disabling the SuperSpeed data path, the controller 212 transitions 332 the retimer circuit 110 to the SNOOP state.

Figure 3C:
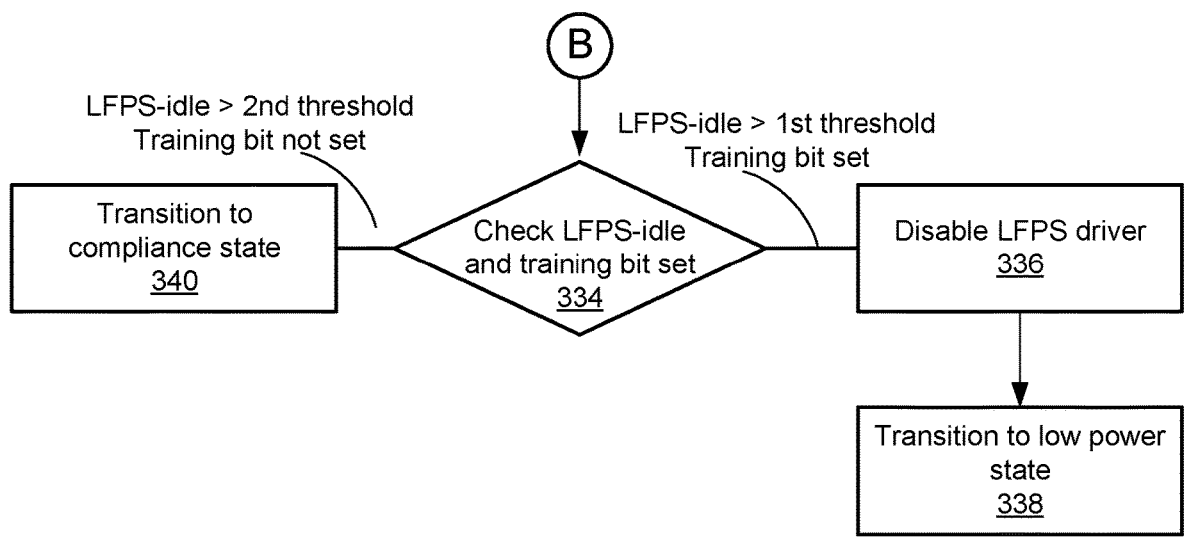
FIG. 3C illustrates a flow chart illustrating a further process for switching operational states of a retimer circuit, in accordance with some embodiments.

During the SNOOP state, the controller 212 continues to monitor 334 the LFPS signals, including LFPS, Ping.LFPS, or Polling.LFPS and check whether and LFPS signal is detected within a specified LFPS idle threshold period of time and whether within the LFPS threshold a training flag bit is set, as shown in FIG. 3C. The training flag is set by the controller 212 at the end of training equalization 322. The controller 212 may clear the training flag after warm reset or after initial power on reset. A Warm Reset is a type of InBand Rest. During an InBand Rest, the controller 212 resets port settings and places the link in the UO state while remaining powered. During a Warm Reset, the controller 212 uses LFPS and takes approximately 100 ms to initiate. Additionally, if the controller 212 does not detect any LFPS signal within the LFPS first idle threshold and training flag bit is set, the controller 212 will disable 336 the LFPS driver circuit and transition 338 to a lower power saving state. In some embodiments, the LFPS first idle threshold is at least 200 ms and the lower power state corresponds to power states U2 or U3. While in the SNOOP state, if the controller 212 does not detect any LFPS signal within the LFPS second idle threshold and training flag bit is not set, the controller 212 transitions 340 to a compliance state. During the compliance state compliance test may be performed on the interconnect system and any received LFPS signals and functional data signals are forwarded. The controller 212 exits from compliance state after observing a warm reset.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. A hardware module is a tangible unit capable of performing certain operations and may be configured or arranged in a certain manner. In some embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms, state machines, or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the word "a" or the word "an" are employed to describe elements and components of the embodiments herein. This is done merely for convenience and to give a general sense of the disclosed embodiments. This description should be read to include at least one and the singular also includes the plural unless it is obvious that it is meant otherwise.

Upon reading this disclosure, those of skill in the art will appreciate still additional alternative structural and functional designs for a system and method for managing the operating state of a retimer circuit through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method of transferring data between interconnected devices, comprising:
   at a retimer circuit configured to couple a host and a device electrically:
      monitoring first data and second data received from the host and the device, respectively, the host and the device being electrically coupled to each other via an interconnect;
      obtaining a host side band detection signal indicating a first data speed of the first data;
      obtaining a device side band detection signal indicating a second data speed of the second data; and
      determining an operational state of the retimer based on (1) at least one of the monitored first data and the monitored second data and (2) at least one of the host side band detection signal and the device side band detection signal.

2. The method of claim 1, further comprising:
   obtaining a host side receiver status signal indicating at least a far-end impedance of a receiver in the host; and
   obtaining a device side receiver status signal indicating at least a far-end impedance of a receiver in the device, wherein the operational state of the retimer is determined based on at least one of the host side receiver status and the device side receiver status.

3. The method of claim 1, wherein determining the operational state of the retimer further comprises determining a negotiated link speed for communicating data between the host and the device.

4. The method of claim 3, wherein the negotiated link speed is 5 Gbps or 10 Gbps in accordance with a determination of the highest data rates supported by the host and the device.

5. The method of claim 4, wherein obtaining the host side band detection signal further comprises:
   receiving one or more high speed signaling handshake messages;
   determining a loss of the high speed signaling handshake messages; and
   determining the first data speed and the negotiated link speed based on the loss of the high speed signaling handshake messages.

6. The method of claim 4, wherein the negotiated link speed is 5 Gbps, the method further comprising:
   determining that (1) a first highest data rate supported by a first one of the host and device is 5 Gbps and (2) that a second highest data rate supported by a second one of the host and device is 10 Gbps, the second one of the host and device being distinct from the first one of the host and device.

7. The method of claim 3, further comprising enabling a communication link between the host and the device according to the negotiated link speed.

8. The method of claim 7, further comprising:
   training a data path associated with the communication link, including at least one of:
      training an equalizer configured to condition the first data received from the host or the second data received form the device; and
      training a clock data recovery (CDR) circuit configured to generate a clock signal based on the negotiated link speed.

9. The method of claim 1, further comprising:
   generating, by a clock data recovery circuit, a recovered clock having a clock rate matching a rate of a clock signal in the first data; and
   providing, by the clock data recovery circuit, the recovered clock to a first transmitter to control a transmission rate of the second data to the host.

10. The method of claim 9, wherein the clock data recovery circuit further includes an inductor capacitor oscillator that is tunable and configured to generate the recovered clock.

11. A retimer circuit for transferring data between interconnected devices, comprising:
    a host receiver circuit configured to receive first data from a host and transmit the first data to a device via a device transmitter circuit, the host and the device being electrically coupled to each other via an interconnect;
    a host transmitter circuit configured to receive second data from the device via a device receiver circuit and transmit the second data to the host; and
    a controller coupled to the host receiver circuit, the device transmitter circuit, the device receiver circuit, and the host transmitter circuit, the controller being configured to:
       obtain a host side band detection signal indicating a first data speed of the first data;
       obtain a device side band detection signal indicating a second data speed of the second data; and determine an operational state of the retimer based on (1) at least one of the monitored first data and the monitored second data and (2) at least one of the host side band detection signal and the device side band detection signal.

12. The retimer circuit of claim 11, further comprising:
the device receiver circuit configured to receive the second data from the device and transmit the second data to the host via the host transmitter circuit, the device receiver circuit being distinct from the host receiver circuit; and
the device transmitter circuit configured to receive the first data from the host via the host receiver circuit and transmit the first data to the device, the device transmitter circuit being distinct from the host transmitter circuit.

13. The retimer circuit of claim 11, further comprising:
a clock data recovery circuit configured to generate a clock signal, wherein the host transmitter circuit is configured to modify a second data speed of the second data according to a frequency of the clock signal generated by the clock data recovery circuit.

14. The retimer circuit of claim 11, wherein the host side band detection signal is associated with a first voltage level indicating that a data rate of the first data is selected from one or more predetermined data speeds and a second voltage level indicating that the data rate of the first data is distinct from any of the one or more predetermined data speeds.

15. The retimer circuit of claim 11, wherein the controller is configured to obtain the host side band detection signal by:
receiving one or more LFPS messages transmitted at a side band from 20 MHz to 50 MHz, the LFPS messages including one or more pulse trains; and
determining a pulse duration of the pulse trains and an idle duration of an electrical idle period between two of the pulse trains, wherein the first data speed of the first data is determined based on the determined pulse and idle durations.

16. The retimer circuit of claim 11, wherein the retimer circuit is configured, in accordance with the operational state of the retimer, to transmit the first data to the device, and transmit the second data to the host.

17. The retimer circuit of claim 11, wherein the operational state of the retimer is associated with a combined retimer operating state, and the controller is configured to map a group of host and device operational states to the combined retimer operating state.

18. The retimer circuit of claim 17, wherein the group of host and device operational states includes (1) a Polling.LFPS state configured to synchronize operations between the host and the device after exiting from a receiver detection state and (2) a plurality of power saving states.

19. The retimer circuit of claim 11, wherein the controller is configured to detect a connection of the host with the retimer circuit, and the operational state is determined in response to the detection of the connection of the host with the retimer circuit.

20. The retimer circuit of claim 11, wherein the controller is configured to detect a message in the first data provided by the host and determine the operational state of the retimer based on the message.

* * * * *